United States Patent [19]

Brusewitz

[11] Patent Number: 5,617,482
[45] Date of Patent: Apr. 1, 1997

[54] METHOD OF MOTION COMPENSATION AND ELASTIC DEFORMATION IN PICTURE SEQUENCES

[75] Inventor: Harald Brusewitz, Älvsjö, Sweden

[73] Assignee: Televerket, Farsta, Sweden

[21] Appl. No.: 367,773

[22] Filed: Jan. 3, 1995

Related U.S. Application Data

[63] Continuation of Ser. No. 969,221, filed as PCT/SE91/00529 Aug. 12, 1991, abandoned.

[30] Foreign Application Priority Data

Aug. 15, 1990 [SE] Sweden ................................ 9002647

[51] Int. Cl.$^6$ .............................. G06K 9/32; G06K 9/00
[52] U.S. Cl. ............................................ 382/107; 382/295
[58] Field of Search ................................. 382/14, 27, 28, 382/41, 56, 107, 195, 296, 297, 295; 358/435, 436; 395/137, 138, 139; 348/699, 416, 352, 351, 155, 154, 19

[56] References Cited

U.S. PATENT DOCUMENTS

| | | | |
|---|---|---|---|
| 4,600,919 | 7/1986 | Stern | 340/725 |
| 4,924,310 | 5/1990 | von Brandt | 358/133 |
| 4,984,074 | 1/1991 | Uomori et al. | 348/699 |
| 5,019,901 | 5/1991 | Uomori et al. | 348/416 |

FOREIGN PATENT DOCUMENTS

| | | | |
|---|---|---|---|
| 0280316 | 8/1988 | European Pat. Off. | G06F 15/62 |
| 0280317 | 8/1988 | European Pat. Off. | G06F 15/62 |

*Primary Examiner*—Jose L. Couso
*Assistant Examiner*—Matthew C. Bella
*Attorney, Agent, or Firm*—Oblon, Spivak, McClelland, Maier & Neustadt, P.C.

[57] ABSTRACT

A method of motion compensation and elastic deformation in picture sequences in transmission of moving pictures between a transmitter and a receiver, that is a picture coding method in which the pixel values of the picture are determined using a previous picture. In the transmitter, each picture in the picture sequence is divided into triangles by suitably choosing corner points, and the motion between two successive pictures is estimated such that the motion vectors of all the corner points can be established. Information about the corner points and/or the motion vectors is transmitted from the transmitter to the receiver, in which the motion vectors of the internal points of the triangles are calculated using the three transmitted motion vectors belonging to the respective triangle. The pixel values in the corner points of the triangles and in the internal points of the triangles are calculated using the transmitted and the calculated motion vectors, respectively. Preferably, the motion vectors of the internal points of the triangles are calculated by interpolation.

2 Claims, 2 Drawing Sheets

METHOD OF MOTION COMPENSATION AND ELASTIC DEFORMATION IN PICTURE SEQUENCES

This application is a continuation of application Ser. No. 07/969,221, filed on Feb. 12, 1993, now abandoned, filed as PCT Application Number PCT/SE91/00529 on Aug. 12, 1991.

FIELD OF THE INVENTION

The present invention relates to a method of motion compensation and elastic deformation in the picture sequences, that is a picture coding method in which the pixel values in a picture are determined using the previous picture. It is assumed that the motion between two successive pictures is known, that is the motion vector field is known. The motion may include both translation and deformation.

STATE OF THE ART

It is previously known to use motion vector fields for picture coding. In this connection, the picture is divided into rectangular blocks. In this division problems may occur with visible squares in the picture sequence because of discontinuities at the edges of the block. According to the present invention this problem is solved by dividing the picture in triangles instead and interpolate the motion field.

SUMMARY OF THE INVENTION

Thus, the present invention provides a method of motion compensation and elastic deformation in picture sequences in transmission of moving pictures between a transmitter and a receiver. According to the invention each picture in a picture sequence is divided into triangles and the motion between two successive pictures is estimated such that the motion vectors in the corner points of the triangles can be determined. Information about the corner points and/or the motion vectors is transmitted from the transmitter to the receiver. In the receiver the motion vectors of the internal points of the triangles are calculated using the three transmitted motion vectors associated with the respective triangle. The pixel values of the corner points of the respective triangles are calculated using the transmitted motion vectors and the previous picture and the internal pixel values are calculated using the calculated motion vectors and the previous picture.

Further features of the invention are set forth in detail in the accompanying claims.

BRIEF DESCRIPTION OF THE DRAWINGS

The drawing is a schematic illustration of two successive pictures in which corresponding triangles have been drawn and the respective motion vectors, in which FIG. 1. shows translation, FIG. 2. rotation and FIG. 3. deformation.

The invention is described below in detail.

DETAILED DESCRIPTION OF A PREFERRED EMBODIMENT OF THE INVENTION

The purpose of the invention is to enable transmission of picture sequences by starting from one picture and only transmit motion vectors. There already exists methods of dividing the pictures in rectangular blocks and of determining the motion vectors applying within the blocks. A problem is that square blocks then may become visible in the picture because of discontinuities in the motion vector field between adjacent blocks.

According to the present invention the picture is divided into triangles instead. The division may be fixed or may be adapted to the picture in question and the motion therein. When the corner points of each triangle are established the motion vectors in the corner points are determined relative to the previous picture in the sequence. Motion vectors are assigned to points within each triangle by interpolating the motion vectors in the corner points. Thus, contiguous triangles have the same motion vectors along the whole common side. Thereby no discontinuities occur.

The pixel values are obtained from the previous picture using the motion vector fields obtained in this way. Generally, the motion vectors indicate undefined points in the previous picture. The pixel value is then obtained using an interpolation filter, preferably in accordance with our copending patent application titled "Method of moving a pixel a subpixel distance".

Figure 1:
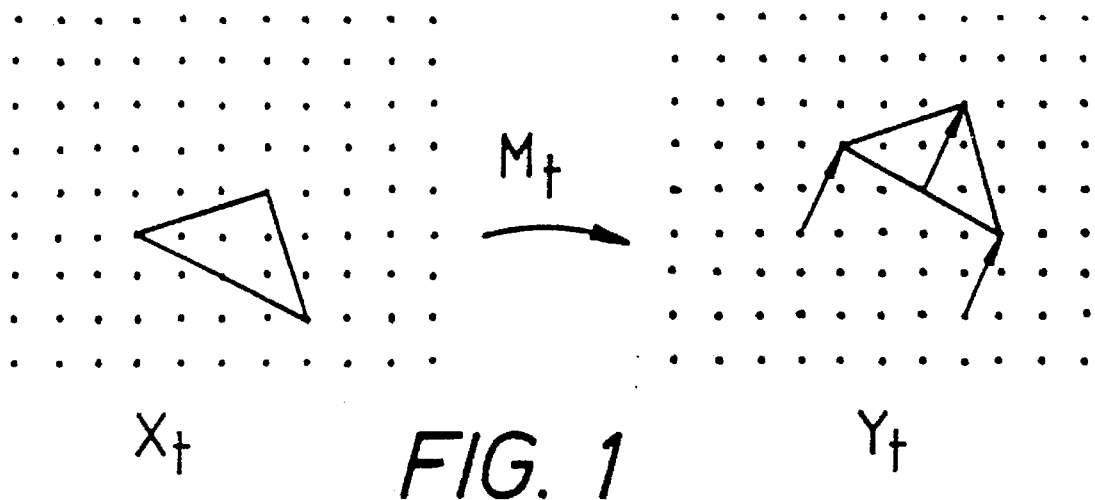
Figure 2:
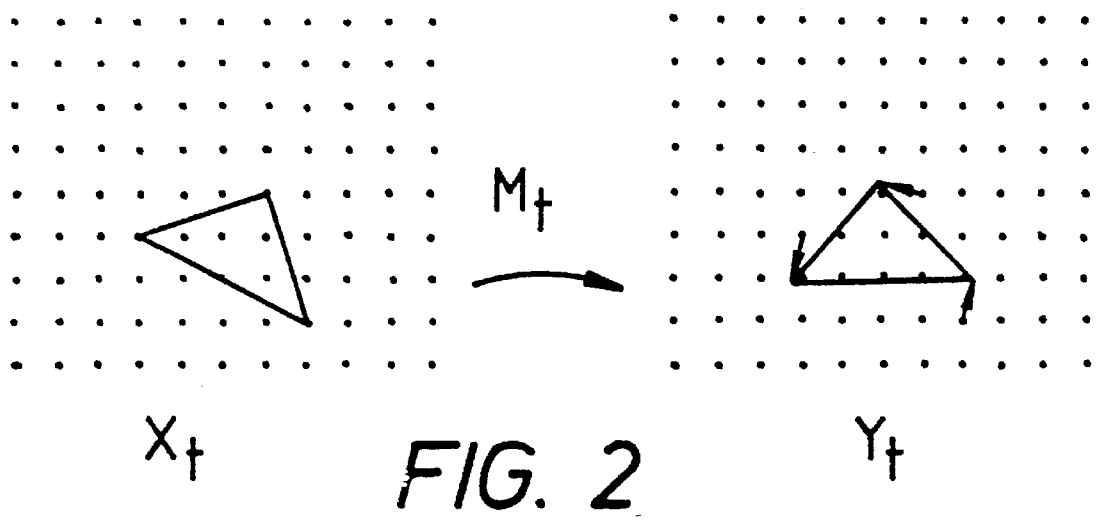
Figure 3:
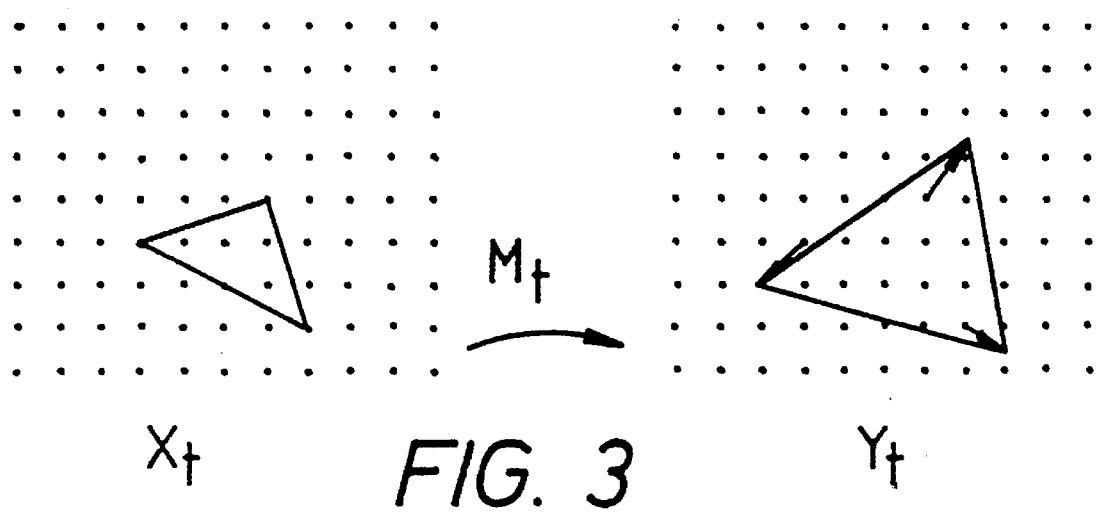
Figure 4A:
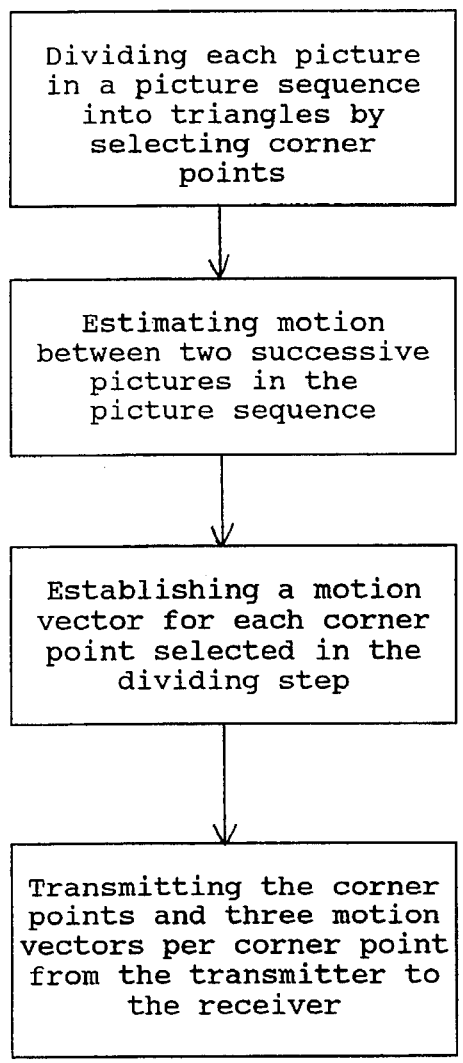
FIGS. 4A and 4B are flowcharts showing the steps performed in the transmitter and receiver, respectively.
Figure 4B:
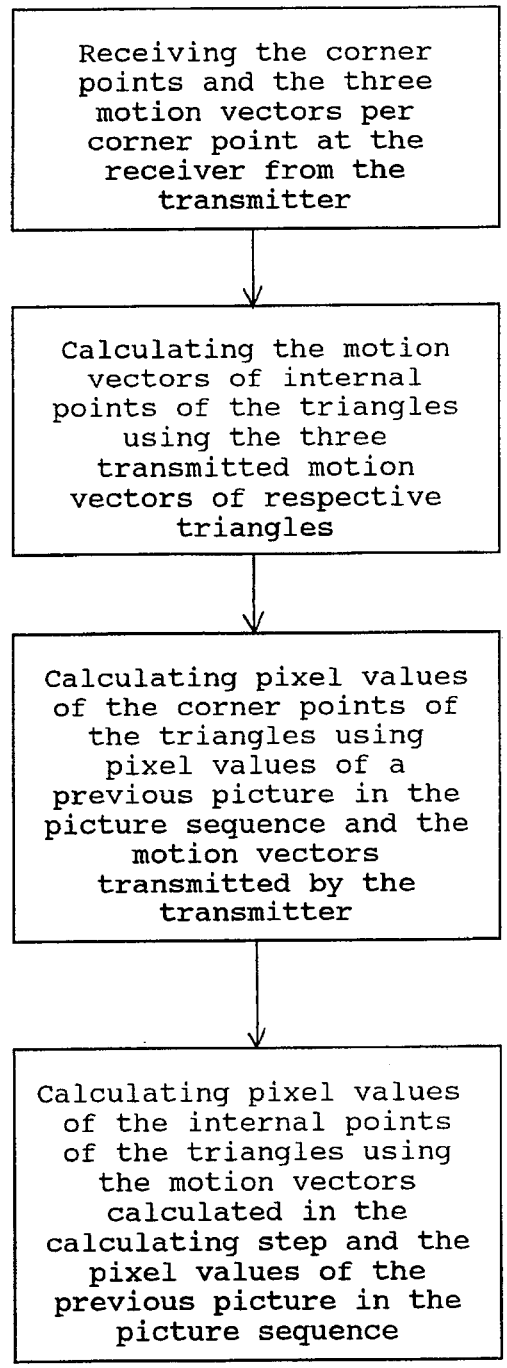

In the figures, various ways of how a triangle can be moved are shown. FIG. 1 shows a translation, FIG. 2 a rotation and FIG. 3 a deformation, in this case an enlargement. Normally, the movement of the triangle is a combination of these three basic types. The co-ordinates of the new triangle can be expressed in matrix form as $$Y_t = X_t + M_t$$

where $X_t$ is the co-ordinates of the old triangle, $Y_t$ is the new triangle and $M_t$ contains the three motion vectors.

Any point (x, y) may be expressed using the position vectors of the triangle $X_t$. Define a triangle having three corner points $$X_t = \begin{pmatrix} x_1 & y_1 \\ x_2 & y_2 \\ x_3 & y_3 \end{pmatrix}$$

Create a base of vectors $v_1$, $v_2$, $v_3$ using the corner points.

$$\begin{pmatrix} v_1 \\ v_2 \\ v_3 \end{pmatrix} = \begin{pmatrix} x_1 & y_1 \\ x_2 - x_1 & y_2 - y_1 \\ x_3 - x_2 & y_3 - y_2 \end{pmatrix}$$

Then an arbitrary point in the picture plane can be expressed as $$(x, y) = v_1 + a v_2 + b v_3$$

For points within the triangle $X_t$ the following relations apply $0 \leq a \leq 1$ and $0 \leq b \leq a$.

For a given point (x, y) a and b can be calculated with the formulas $$a = \frac{(x - x_1)(y_3 - y_2) - (y - y_1)(x_3 - x_2)}{(x_2 - x_1)(y_3 - y_2) - (y_2 - y_1)(x_3 - x_2)}$$

$$b = \frac{(x - x_2)(y_2 - y_1) - (y - y_1)(x_2 - x_1)}{(x_3 - x_2)(y_2 - y_1) - (y_3 - y_2)(x_2 - x_1)}$$

A set of positions X may be expressed as $$X = B X_t$$

where each line of X is a position $(x_i, y_i)$ and $$B = \begin{pmatrix} \cdot & \cdot & \cdot \\ \cdot & \cdot & \cdot \\ 1-a_i & a_i-b_i & b_i \\ \cdot & \cdot & \cdot \\ \cdot & \cdot & \cdot \end{pmatrix}$$

Several triangles can be processed at the same time with a matrix $X_t$ containing all the triangle corners involved. With a number of corners=nc:

$$X_t = \begin{pmatrix} x_1 & y_1 \\ x_2 & y_2 \\ \cdot & \cdot \\ \cdot & \cdot \\ x_{nc} & y_{nc} \end{pmatrix}$$

Then B is modified such that each line has nc positions and the values $1-a_i$, $a_i-b_i$ and $b_i$ are placed in the positions corresponding to the corner point that is to be used. All other positions are zero.

A continouos motion vector field in the triangle $Y_t$ is obtained if the motion vectors are calculated as $$M = BM_t$$

where the positions in question within the respective triangle are inserted in B.

The triangle division of the picture is performed in the transmitter and the corner points of the triangles are established. Thereafter, the motion vectors and the corner points are established. First, a complete picture is transmitted between the transmitter and receiver. Thereafter, only motion vectors and information about the corner point associated with each motion vector are transmitted. In the receiver the motion vector of every point in the picture is calculated by interpolation of the motion vectors in the corner point (that is by the formula $M=BM_t$). Thereafter, all the pixel values can be calculated using the motion vectors and the previous picture.

Thus, the present invention provides a method of motion compensation and elastic deformation in picture sequences which solves the above problem with discontinuities between blocks in the picture. The invention is defined in the accompanying claims.

I claim:

1. Method of motion compensation and elastic deformation in a picture sequence transmitted between a transmitter and a receiver, the method comprising the following steps in the transmitter:

dividing each picture in a picture sequence into triangles by selecting corner points;

estimating motion between two successive pictures in the picture sequence;

establishing a motion vector for each corner point selected in the dividing step; and transmitting the corner points and three motion vectors per corner point from the transmitter to the receiver; and the method comprising the following steps in the receiver:

receiving the corner points and the three motion vectors per corner point at the receiver from the transmitter;

calculating the motion vectors of internal points of the triangles using the three transmitted motion vectors of respective triangles;

calculating pixel values of the corner points of the triangles using pixel values of a previous picture in the picture sequence and the motion vectors transmitted by the transmitter; and calculating pixel values of the internal points of the triangles using the motion vectors calculated in the calculating step and the pixel values of the previous picture in the picture sequence.

2. Method according to claim 1, wherein the step of calculating the motion vectors of the internal points comprises calculating the motion vectors of the internal points of the triangles by interpolation.

* * * * *